June 12, 1934.  O. U. ZERK  1,962,548
TRIPOD
Filed May 14, 1932   2 Sheets-Sheet 2
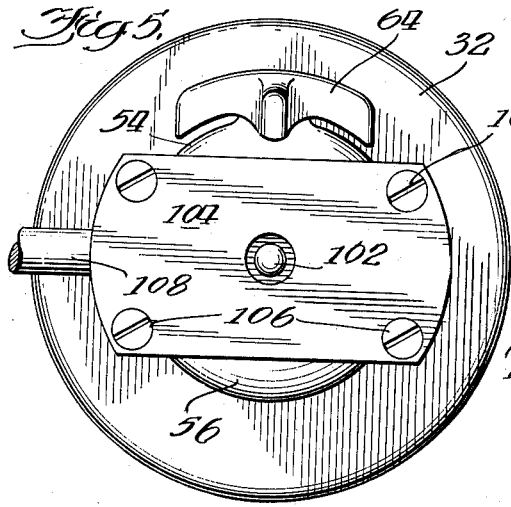
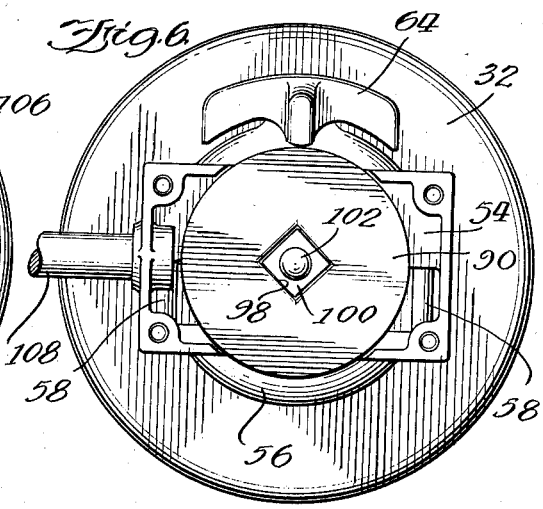
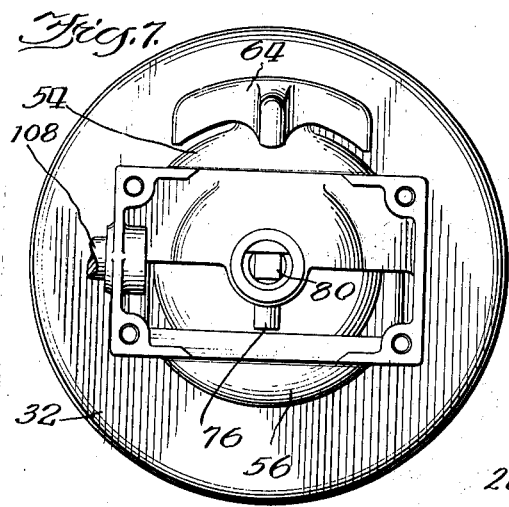
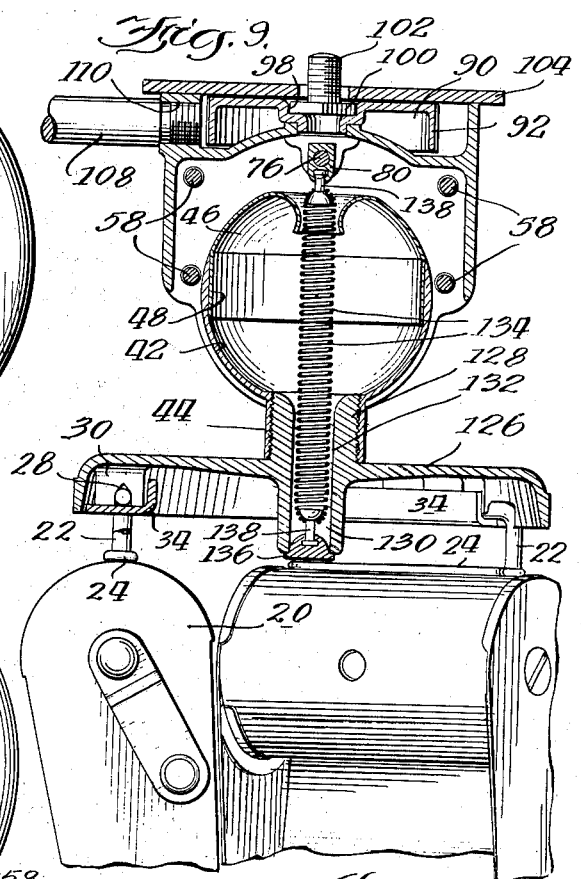
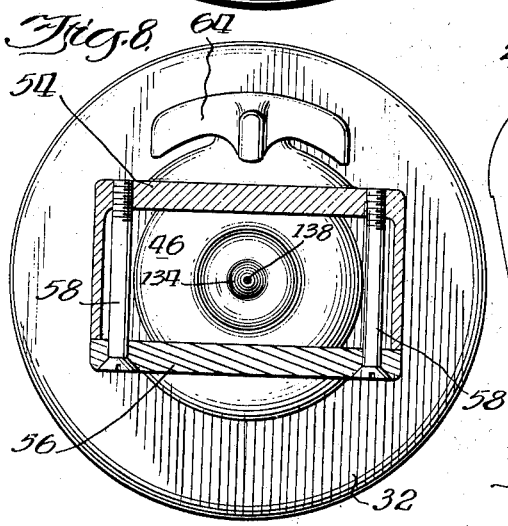
Inventor:
Oscar U. Zerk
By Williams, Bradbury,
McCaleb & Hinkle Attys.

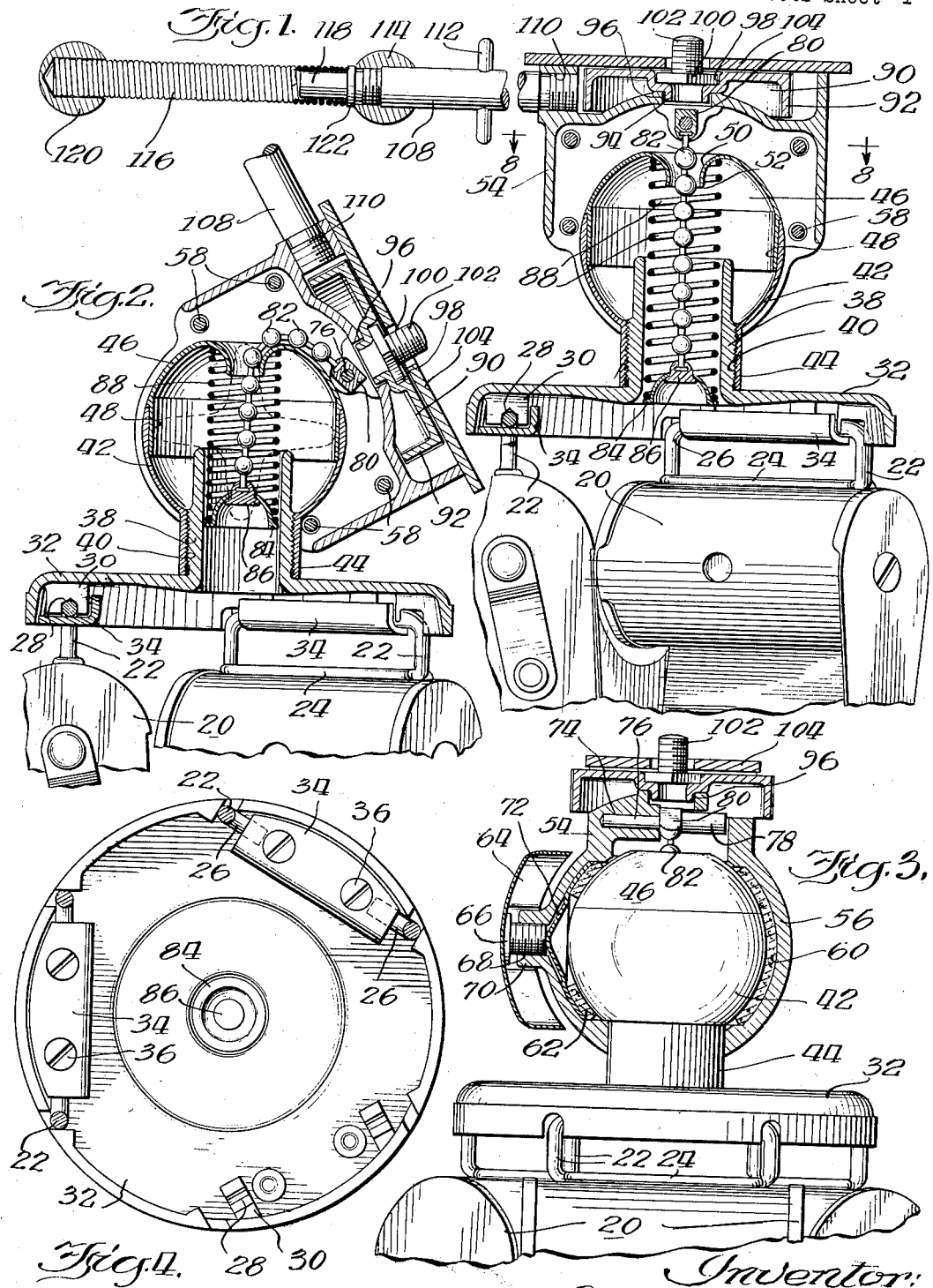

Patented June 12, 1934

1,962,548

UNITED STATES PATENT OFFICE 1,962,548

TRIPOD

Oscar U. Zerk, Chicago, Ill.

Application May 14, 1932, Serial No. 611,339

10 Claims. (Cl. 248—47)

My invention relates generally to tripods and more particularly to improvements in universally jointed tripod heads of the type disclosed in my copending application, Serial No. 314,073, filed October 22, 1928. The legs connected to the tripod head forming the subject-matter of this invention are disclosed and claimed in my copending application, Serial No. 611,338, filed May 14, 1932.

The tripod head of my present invention is particularly adapted for use with motion picture cameras, especially those of the smaller type used by amateurs. In the taking of motion pictures, it is frequently desirable or necessary to tilt the camera to a considerable angle. In photographing such objects as animals and trees by means of a telephoto lens, or photographing landscape from a mountain top, or in photographing tall buildings, the camera is tilted through such a great angle that the center of gravity of the camera is situated a considerable distance from the vertical axis of the supporting means and, as a consequence, it requires considerable force to swing the camera to normal position. To overcome this disadvantage, it has been proposed to provide a plurality of balancing springs in a measure to compensate for the weight of the camera, when it is tilted an appreciable extent from the vertical axis of its support. In tripod heads of the latter type, one of the springs is tensioned when the camera is tilted in one direction and the other spring is tensioned when the camera is tilted in the opposite direction.

The main purpose of my present invention is to provide a tripod head wherein only one spring is used to compensate for the weight of the camera when tilted in either direction. In the construction disclosed herein, the tilt-table is connected to the tripod proper by a universal ball and socket joint, and since the ball of this connection is made hollow to decrease the weight of the tripod as a whole, I utilize the space within the hollow portion of the ball and also a space below the ball as a location for the single camera weight-compensating spring. According to my invention, the spring may be either a compression spring or a tension spring. When using a compression spring, it is a coil spring of relatively large diameter located within the ball and seating against the inside top of the ball around a bell mouth annular flange extending inwardly from the top of the ball. A stirrup, in the form of a cup-shaped disc, forms a seat for the lower end of the spring, and a link ball chain has one end pivotally connected to the stirrup and the other end swiveled to the tilt-table. When the tripod table is tilted, the point at which the upper end of the linked ball chain is attached moves away from its normal position directly over the bell mouth opening at the top of the ball and thereby tensions the spring. During the initial portion of the tilting movement of the tilt-table from its normal position, the spring is compressed only to a very slight extent, but as the table is tilted further from the vertical axis the movement of the pivot for the upper end of the chain becomes relatively great, and the spring is consequently compressed to a degree corresponding roughly with the degree of movement of the tilt-table from its normal position. The bell mouth opening in the ball is of considerably greater diameter than that of the ball portions of the chain, so that the tilt-table may be moved through an appreciable angle from the normal vertical position without being restrained to any noticeable extent by the force of the spring. This, of course, is highly desirable, because during the initial portion of the movement the center of gravity of the camera is not a sufficient distance from the vertical axis of its support to exert an appreciable force tending further to tilt the tilt-table. When, however, the center of gravity of the camera moves so far away from the vertical axis of the tripod support that substantially the whole weight, or the greater part of the weight, of both the front and rear portions of the camera is moved beyond the vertical axis of the tripod, the balancing or compensating effect of the spring is utilized to make it easy further to tilt the camera or to return it to its normal position, and to make it possible to clamp the camera in any desired position by slightly increasing the friction between the ball and its socket.

When, as above suggested, a centrally located spring is placed in a vertical position and the pulling means (in the present instance a linked ball chain) is situated within the spring and is pulled at an angle to the center line of the spring, there naturally will be some friction at the bending point of the pulling means. It is imperative to reduce this friction to a minimum, in order that the same may have no appreciable effect upon the movement of the camera. I accomplish this by providing the bell mouth opening in the upper ball with a relatively great radius of curvature and by utilizing a chain having contact with the bell mouth at only a relatively small number of points. The fact that the upper end of the chain is pivoted to the tilt-table also aids materially in reducing this friction. The fact that the chain which constitutes the pulling means is swiveled at each joint and at its ends prevents the chain from being twisted.

In a ball chain, the balls are customarily swiveled to the interconnecting links, and this type of chain thus forms a very practical pulling means for compressing the spring.

In a second embodiment of my invention, an expansion spring is utilized in place of the compression spring and the chain or equivalent means may be eliminated. While the construction of my second embodiment is substantially the same as my first embodiment, I utilize a swivel joint at only the ends of the spring. If, however, it were desired to compose the spring of several springs coupled together, a series of additional swivel joints could be interposed between such springs. The ball chain might also be connected between the end of the tension springs and the tilt-table.

In order to prevent the expansion spring or the link ball chain from catching against the inner edge of the bell mouthed guide, the latter is preferably flared outwardly at its lower end. The tubular portion may, of course, be made of any desired length.

A further object of my invention is to provide an improved form of ball for ball and socket joints of tripods and to provide improved means for securing the ball to the tripod proper. The ball is preferably stamped in two halves made of rustproof steel, the lower ball half having a tubular sleeve formed integrally therewith and either screwed or secured tightly by means of a drive fit to a tubular boss cast integrally with the tripod head plate. After the upper ball half is pressed into the lower half, a true spherical surface on the ball may be obtained by shaving or grinding. It is to be understood that the single compression or expansion spring used to compensate for the weight of the camera when tilted from normal position may be utilized in constructions other than those disclosed in this application, and may be used for a universal connection composed of two separate joints.

To summarize the above objects, it may be stated that the object of my invention is to provide an improved form of universal tripod head which is light in weight, may be economically manufactured, and in which means are provided to compensate for the weight of the camera when tilted from normal position.

Other objects, in addition to those set forth in detail above, will appear from the following description, reference being had to the accompanying drawings in which Figure 1 is a central vertical sectional view of my improved tripod head;

Figure 2 is a similar view thereof showing the tilt-table tilted to its extreme position;

Figure 3 is a central vertical section of the tripod head taken at an angle of 90° relative to the plane of the section of Figure 1;

Figure 4 is a bottom plan view of the tripod head plate, showing the means by which the legs are hinged to said plate;

Figure 5 is a plan view of the tripod head shown in Figure 1;

Figure 6 is a similar view with the camera supporting plate removed;

Figure 7 is a view similar to Figure 6, with the camera attaching screw and its adjusting wheel removed;

Figure 8 is a transverse sectional view taken on the line 8—8 of Figure 1, and

Figure 9 is a central vertical sectional view of a modified form of my invention.

The tripod legs comprise resilient strips which are adapted to be coiled within magazines 20, as is more fully disclosed in my said copending application, Serial No. 611,338, filed May 14, 1932. Each of the magazines 20 has a hinge member 22 secured thereto, preferably by spot welding, the hinge member comprising a wire having a flattened portion 24 welded to the magazine and a pair of upwardly and inwardly projecting arms 26, which are normally received in recesses or notches 28 in lugs 30 projecting downwardly and formed integrally with a head plate 32.

As shown in Figure 4, the projecting arms 26 of the hinge members 22 are held within the notches 28 by an angle plate 34 secured to the head plate 32 by a pair of screws 36. The head plate is preferably a die casting of a relatively light metal and has a central upwardly projecting tubular post 38, a portion 40 of the external surface of which is threaded. A ball half 42 has a downwardly projecting neck 44 which is internally threaded and screwed over the thread portion 40 of the post 38. An upper ball half 46 has a hollow cylindrical portion 48 which fits tightly into a corresponding bore within the lower ball half 42. The upper ball half has a bell mouth 50 surrounding an aperture 52 formed at the center of the ball half, the mouth 50 flaring outwardly, so as to form a continuous smooth curved surface together with the external surface of the upper ball half. A socket half is formed in a tilt-table casting 54, the other socket half comprising a casting 56 which is secured to the casting 54 by a plurality of screws 58. Both of the inner spherical surfaces of the sockets in the casting 54 and 56 are recessed, the casting 56 having a concavo-convex disc 60 of packing held therein and the recesses of the casting 54 having an annular packing 62 positioned therein. The packings are adapted to be pressed against the ball by means of a winged fingerpiece 64, which is preferably formed of a sheet metal stamping and spot-welded to the head 66 of a screw 68, which latter is threaded in a boss 70 formed integrally with the socket casting 54. The end of the screw 68 is adapted to press against the center of a presser plate 72. By tightening the screw 68 the packings 60, 62, which are preferably made of cork or other similar material or composition, are pressed against the outer surface of the ball and the tilt-table may thus be held in any desired position. In normal use the screw 68 will press the packings only relatively lightly against the ball, so that the socket will be readily movable relative to the ball. The packing, however, will exert a sufficient frictional drag appreciably to retard such movement and will thus cause the tilt-table to be moved gradually and without sudden jerks, even though the force manually applied to the handle of the tripod is not absolutely steady.

The socket casting 54 is provided with a drilled hole 74 to receive a pin 76 (Figure 3), which has an enlarged head 78. The pin is held within the socket 74 by the socket half 56. A block 80 is mounted for free rotation upon the pin 76 and serves as a swiveled end for a linked ball chain 82, which depends downwardly therefrom through the bell mouth 50 of the upper ball half 46. An inverted cup shaped stamping 84 is swivelly secured to the lower end of the link ball chain 82 by fitting over an end piece 86 swiveled to the chain. The stamping 84 has a flange forming a seat for the lower end of the compression coil spring 88, the upper end of the spring surrounding the flared bell mouth 50 and pressing against the inside surface of the upper ball half 46.

A wheel 90, having an externally striated depending flange 92 which is manually engageable, is mounted for free rotation relative to the casting 54 by having a flange 94 depending in an aperture 96 formed in the casting. The wheel 90 is preferably a sheet metal stamping and has a square depression 98 formed therein to receive the head 100 of a camera attaching screw 102. The wheel 90 and the camera attaching screw 102 are held in place by a camera supporting plate 104, which is attached to the casting 54 by screws 106 (Figure 5).

A rod 108 has its end threaded to be screwed into a threaded socket 110 formed in the casting 54, and serves as a handle for moving the tilting head of the tripod. A cross pin 112 projects diametrically through the rod 108 and serves as a convenient means for grasping the rod when screwing it into place. A knob 114 is threaded or otherwise suitably secured to the end of the rod 108. The rod 108 has a resilient extension comprising a closely wound coil spring 116, one end of which is tightly wrapped about the extremity 118 of the rod 108, and the other end of which carries a knob 120. A washer 122 is interposed between the spring 116 and the knob 114.

As best shown in Figures 1 and 2, the tripod head may be tilted through a relatively great angle, the movement being limited only by the engagement of one of the screws 58 with the neck 44 of the lower ball half. During the initial portion of such tilting movement from the position shown in Figure 1 to that shown in Figure 2, the spring 88 will not be compressed. When, however, the table has been tilted sufficiently that the balls of the linked chain come in contact with the bell mouth 50, further tilting movement will cause the chain to be pulled upwardly and the spring thereby compressed. The spring, through the chain, will thus apply a restraining force to the tilting movement which will substantially compensate for the torque due to the weight of the camera, as its center of gravity becomes more and more eccentric with respect to the axis of the tripod. The restraining force of the chain will increase not only due to the increased tension of the spring but also due to the slight increase in friction between the chain and the surface of the upper ball half. Thus the spring will serve as a means practically to balance the camera in any position to which it may be tilted. It will be understood that the packings 60 and 62 exert a frictional drag tending to retard relative movement of the ball and socket, and this drag will also aid in preventing the camera from moving solely by the force of gravity.

The amount of the drag applied by the packings 60 and 62 may, of course, readily be adjusted by tightening the screw 68. If desired, the socket may be clamped to the ball by tightening the pressure adjusting screw 68.

In Figure 9, I have illustrated a modified form of my invention in which most of the parts are substantially identical with those previously described, and similar reference characters have therefore been applied to the corresponding parts. In this construction, the head plate 126 has an upwardly extending tubular projection 128 and a downwardly extending tubular projection 130, these two projections forming a continuous cylindrical opening 132 into which a tension spring 134 extends. The lower end of the tension spring is swiveled to an anchor piece 136, which is of diameter greater than that of the opening 132. The upper end of the tension spring 134 is swiveled to a block 80, as previously described, suitable connecting links 138 being provided at each end of the spring to connect it to the block 80 and the anchor piece 136.

The operation of the construction shown in Figure 9 will be substantially the same as that of the previously described embodiment. It will be noted that the lower end of the bell mouth formed in the upper ball half is flared outwardly, so that the coils of the spring 134 will slide freely therethrough.

While the construction shown in Figures 1 to 8 is the preferred construction, the embodiment of my invention shown in Figure 9 may be advantageous in some instances and is illustrated to indicate one of a number of different modifications which may be made in accordance with the broader principles of my invention.

While I have shown and described a particular embodiment of my invention, it will be apparent to those skilled in the art that various modifications in design and construction may be made without departing from the spirit of my invention.

What I claim as new and desire to secure by Letters Patent of the United States is:

1. In a tripod head, the combination of a support, a normally horizontal tilt-table connected to said support for universal movement relative thereto, a guide aperture in said support above the axis of tilting and a single spring extending through said aperture and held against lateral movement thereby, said spring being anchored to said table and to said support, and being thus operative to exert an increased force in a direction tending to move said tilt-table to normal position when moved therefrom in either direction.

2. In a tripod, the combination of a support, a tilt-table mounted for universal movement relative to said support, a compression coil spring, and means for compressing said spring upon tilting said tilt-table in either direction, said means comprising a flexible element having one end pivotally secured to said table and the other end secured to said spring, said element passing through the coils of said spring whereby tilting movement of said tilt-table will in either direction through said element compress said spring.

3. In a tripod, the combination of a support having a member with a surface of revolution, a tilt-table having a socket fitting over said member, and resilient means mounted within said member and connected thereto and to said table and constructed and arranged resiliently to resist tilting movement of said table in either direction.

4. In a tripod, the combination of a head plate having an upwardly extending tubular projection, a hollow ball secured over said projection and enclosing the same, a tilt-table having a socket embracing said ball, a linked ball chain pivotally secured to said table and depending into said projection, and a compression coil spring surrounding said chain having its lower end connected to the lower end of said chain and its upper end engaging the top of said ball.

5. In a tripod, the combination of a head plate having a tubular upwardly extending projection, a hollow ball secured over said projection and enclosing the latter, a tilt-table mounted for universal movement on said ball, a compression coil spring mounted within said ball, and a tension element operatively connected to said compression spring and to said tilt-table whereby tilting of the latter in either direction will cause compression of said spring.

6. In a tripod, the combination of a support, a normally horizontal tilt-table universally connected to said support, and a single compression coil spring carried by said support and operatively connected to said tilt-table for returning said tilt-table when the latter is tilted from normal position in either direction relative to said support.

7. In a tripod the combination of a support having one element of a movable joint thereon, a table tiltable relative to said support and carrying the mating element of said movable joint, a resilient tension element having one end engaging said table and the other end engaging said support and adapted to exert a force upon said tilt-table tending to return the latter to normal position, means to prevent said table from an angular movement relative to the plane of its tilting movement, and means to lock said table in any adjusted position.

8. In a tripod the combination of a support having one element of a movable joint thereon, a table tiltable relative to said support and carrying the mating element of said movable joint, a resilient tension element having one end engaging said table and the other end engaging said support and adapted to exert a force upon said tilt-table tending to return the latter to normal position, said resilient tension element being in the form of a coil spring arranged to be flexed through substantially a right angle upon relative movement of the elements constituting said joint, means to prevent said table from an angular movement relative to the plane of its tilting movement, and means to lock said table in any adjusted position.

9. In a tripod the combination of a support having one element of a movable joint thereon, a table tiltable relative to said support and carrying the mating element of said movable joint, a resilient tension element having one end secured to said table and the other end thereof anchored to said support and adapted to exert a force upon said tilt-table tending to return the latter to normal position, means to prevent said table from angular movement relative to the plane of its tilting movement, and means to lock said table in any adjusted position.

10. In a tripod, the combination of a head plate having an upwardly extending tubular projection, a hollow ball secured over said projection and enclosing the same, a tilt-table having a socket embracing said ball, means pivotally secured to said table and depending into said projection, and a compression coil spring surrounding said means and having its lower end connected to the lower end of said means and its upper end engaging the top of said ball.

OSCAR U. ZERK.